United States Patent [19]
Fukuda

[11] Patent Number: 5,577,738
[45] Date of Patent: Nov. 26, 1996

[54] OUTSIDE TYPE MECHANICAL SEAL DEVICE

[76] Inventor: Michihito Fukuda, 2-2-63, Matsuta Omiya, Tsurumi-ku, Osaka, Japan

[21] Appl. No.: 588,757

[22] Filed: Jan. 19, 1996

Related U.S. Application Data

[63] Continuation of Ser. No. 235,281, Apr. 29, 1994, abandoned.

[51] Int. Cl.⁶ ........................................ F16J 15/34
[52] U.S. Cl. ................. 277/9.5; 277/65; 277/85
[58] Field of Search ................. 277/9, 9.5, 38, 277/39, 40, 65, 85

[56] References Cited

U.S. PATENT DOCUMENTS

| | | | |
|---|---|---|---|
| 3,155,393 | 11/1964 | Hummer | 277/85 |
| 3,218,110 | 11/1965 | Conner | 277/85 |
| 3,395,955 | 8/1968 | Mansell et al. | 277/65 |
| 3,467,396 | 9/1969 | Hershey | 277/65 |
| 3,621,443 | 11/1971 | Sewell | 277/65 |
| 4,377,290 | 3/1983 | Netzel | 277/40 |
| 4,625,977 | 12/1986 | Azibert et al. | 277/9 |
| 4,872,689 | 10/1989 | Drumm | 277/9.5 |
| 4,973,065 | 11/1990 | Habich | 277/85 |
| 5,275,421 | 1/1994 | Hornsby | 277/9 |
| 5,344,161 | 9/1994 | Sandgren | 277/38 |
| 5,356,158 | 10/1994 | Simmons et al. | 277/9.5 X |

FOREIGN PATENT DOCUMENTS

| | | | |
|---|---|---|---|
| 89/02999 | 4/1989 | WIPO | 277/9.5 |

*Primary Examiner*—William A. Cuchlinski, Jr.
*Assistant Examiner*—John L. Beres
*Attorney, Agent, or Firm*—Moonray Kojima

[57] ABSTRACT

The invention discloses an outside type mechanical seal device disposing the mechanical seal main body at the atmospheric side so as to stop leak of shaft seal of rotary shaft, comprising an annular stopper ring fixed on the rotary shaft by a setbolt, an annular flange bolted to the fixed side, plural protrusions formed integrally at positions confronting the stopper ring outer circumference in the flange at specified intervals to the outer circumference, spacers interposed between the inside of the protrusions and the outer circumference of the stopper ring, and cap bolts detachably driven into the stopper ring through the protrusions and spacers from outside the protrusions, wherein the axial center of rotary shaft of the stopper ring disposed on the rotary shaft is securely positioned in the radial direction and thrust direction, and the entire outside type mechanical seal composed of multiple parts is formed into one integral unit, thereby facilitating the assembling performance.

2 Claims, 5 Drawing Sheets

OUTSIDE TYPE MECHANICAL SEAL DEVICE

This is a continuation of Ser. No. 08/235,281 filed Apr. 29, 1994, now abandoned.

SUMMARY OF THE INVENTION

The present invention relates to an outside type mechanical seal device disposing the mechanical seal main body at the atmospheric side so as to stop leak of shaft seal of rotary shaft, comprising an annular stopper ring fixed on the rotary shaft by a setbolt, an annular flange bolted to the fixed side, plural protrusions formed integrally at positions confronting the stopper ring outer circumference in the flange at specified intervals to the outer circumference, spacers interposed between the inside of the protrusions and the outer circumference of the stopper ring, and cap bolts detachably driven into the stopper ring through the protrusions and spacers from outside the protrusions, wherein the axial center of rotary shaft of the stopper ring disposed on the rotary shaft is securely positioned in the radial direction and thrust direction, and the entire outside type mechanical seal composed of multiple parts is formed into one integral unit, thereby facilitating the assembling performance.

Background of the Invention

Mechanical seal devices have been hitherto classified in two types, that is, the inside type mechanical seal having the mechanical seal main body disposed at the fluid side such as liquid and gas, and the outside type mechanical seal having the mechanical seal main body disposed at the atmospheric side, and the inside type mechanical seal has been available in the integrated unit type, whereas the outside type mechanical seal device is not available in the integrated unit type at the present.

Accordingly, in the conventional outside type mechanical seal, it required an experienced skill in assembling the mechanical seal consisting of multiple parts including flange, seat ring, rotary ring, stopper ring, spring, O-ring and others, between the rotary shaft and the fixed side (for example, the stuffing box of the pump), and the assembling performance was poor.

Objects of the Invention

It is hence a primary object of the invention to present an outside type mechanical seal device capable of securely positioning in the radial direction and thrust direction to the axial center of the rotary shaft of the stopper ring disposed on the rotary shaft, integrating the entire mechanical seal composed of multiple parts into one unit, and facilitating the assembling performance.

It is other object of the invention to present an outside type mechanical seal device capable of achieving more secure positioning in the radial direction and thrust direction to the axial center of the rotary shaft of the stopper ring disposed on the rotary shaft.

EMBODIMENT

An embodiment of the invention is described in detail below according to the drawings.

Figure 1:
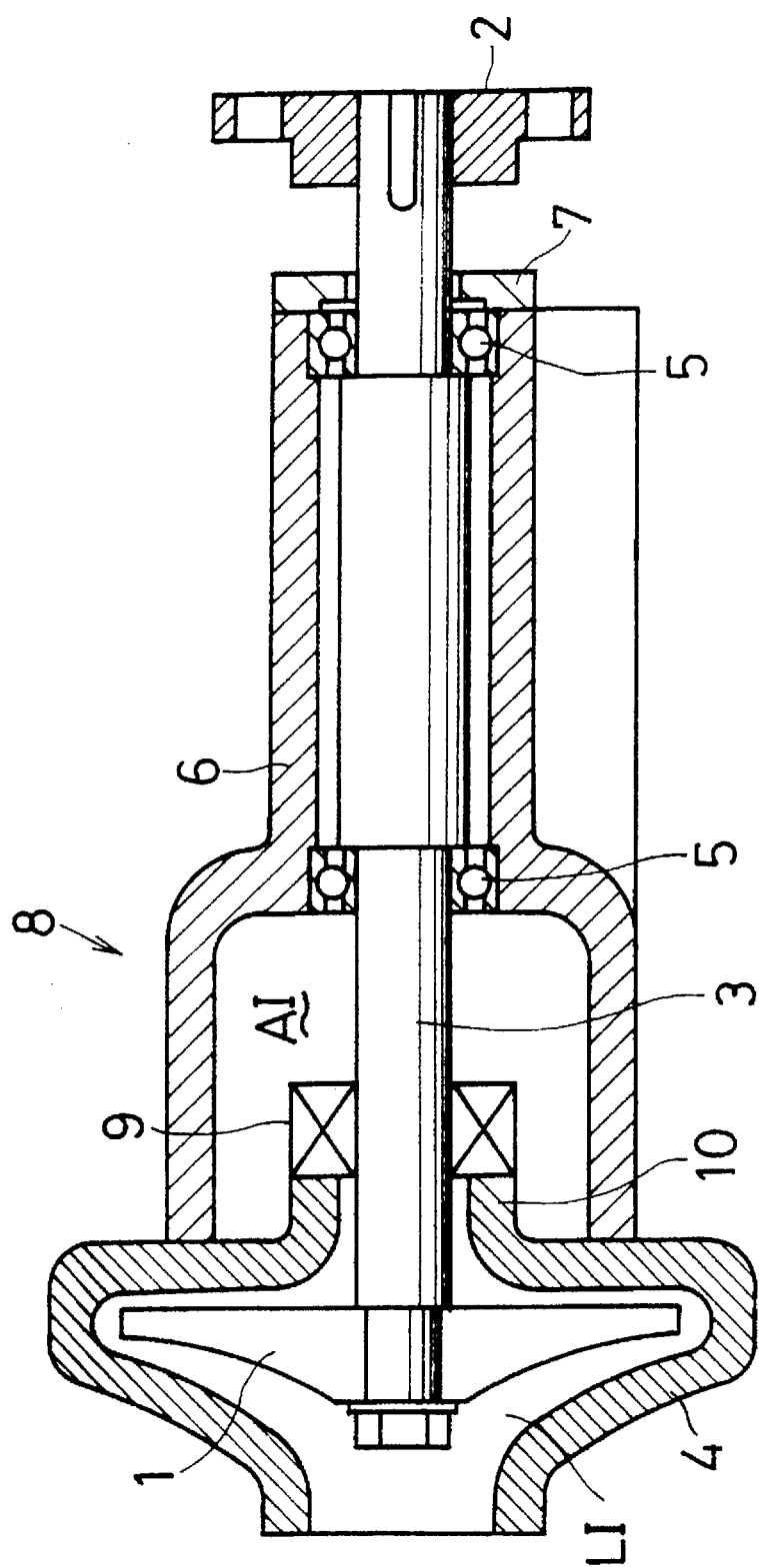
FIG. 1 is a schematic sectional diagram of a pump apparatus showing a mode of use of an outside type mechanical seal device of the invention.

The drawings relate to an outside type mechanical seal device, and first referring to the state of use of the outside type mechanical seal device according to FIG. 1, a rotary shaft 3 (so-called main shaft) having an impeller 1 at one end and a shaft coupling 2 at the other end is provided, and the impeller 1 is enclosed by a pump casing 4, and a bearing box 6 is disposed at two intermediate positions of the rotary shaft 3 through bearings 5, 5, and a bearing cover 7 is fitted to the end of the shaft joint 2 side of the bearing box 6, thereby composing a pump 8.

The outside type mechanical seal device 9 is used as shaft seal between the rotary shaft 3 as rotary element and stuffing box 10 as pump casing 4. In FIG. 1, LI indicates the liquid side, and AI, the atmospheric side.

Figure 2:
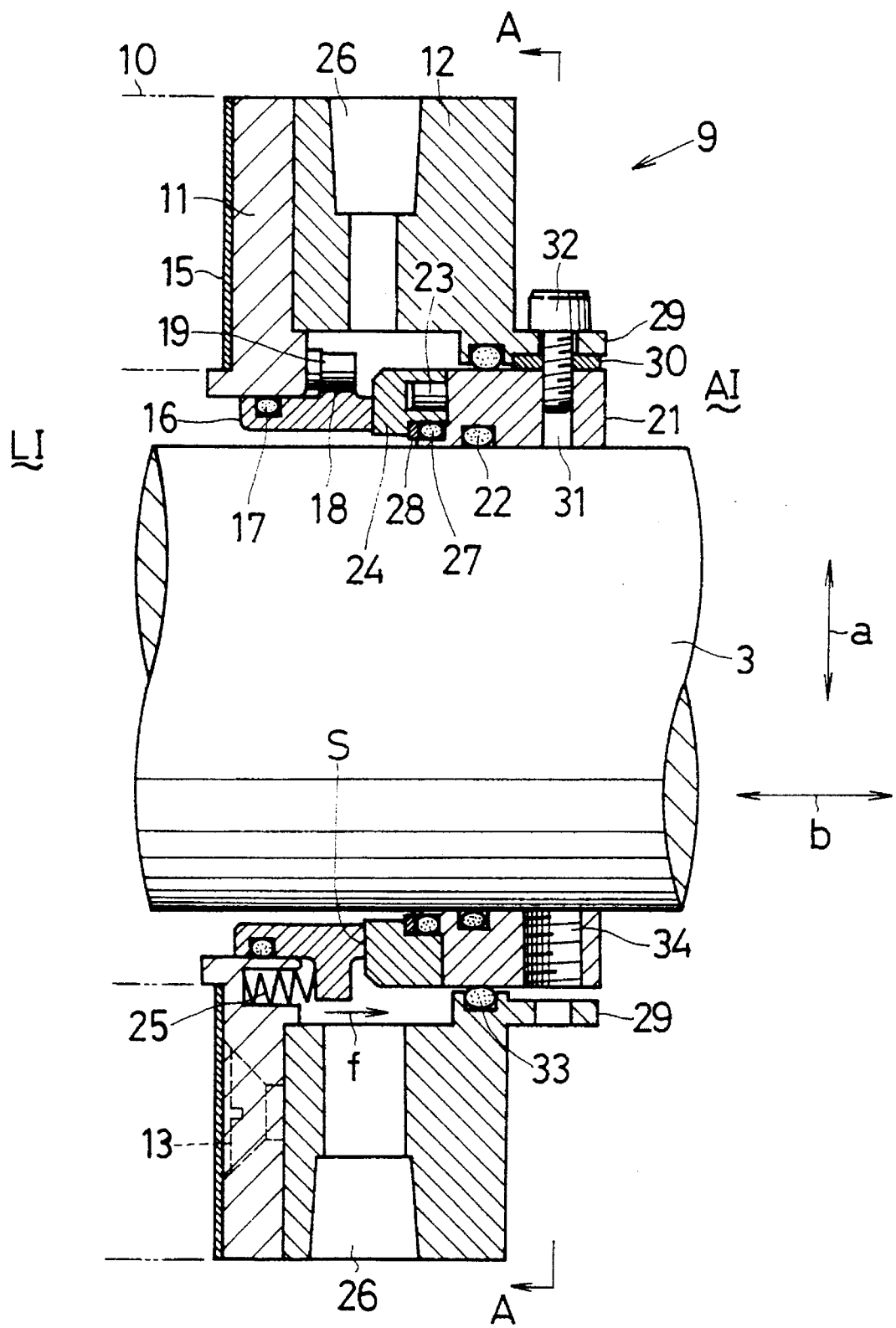
FIG. 2 is a sectional view of the outside type mechanical seal device of the invention.
Figure 3:
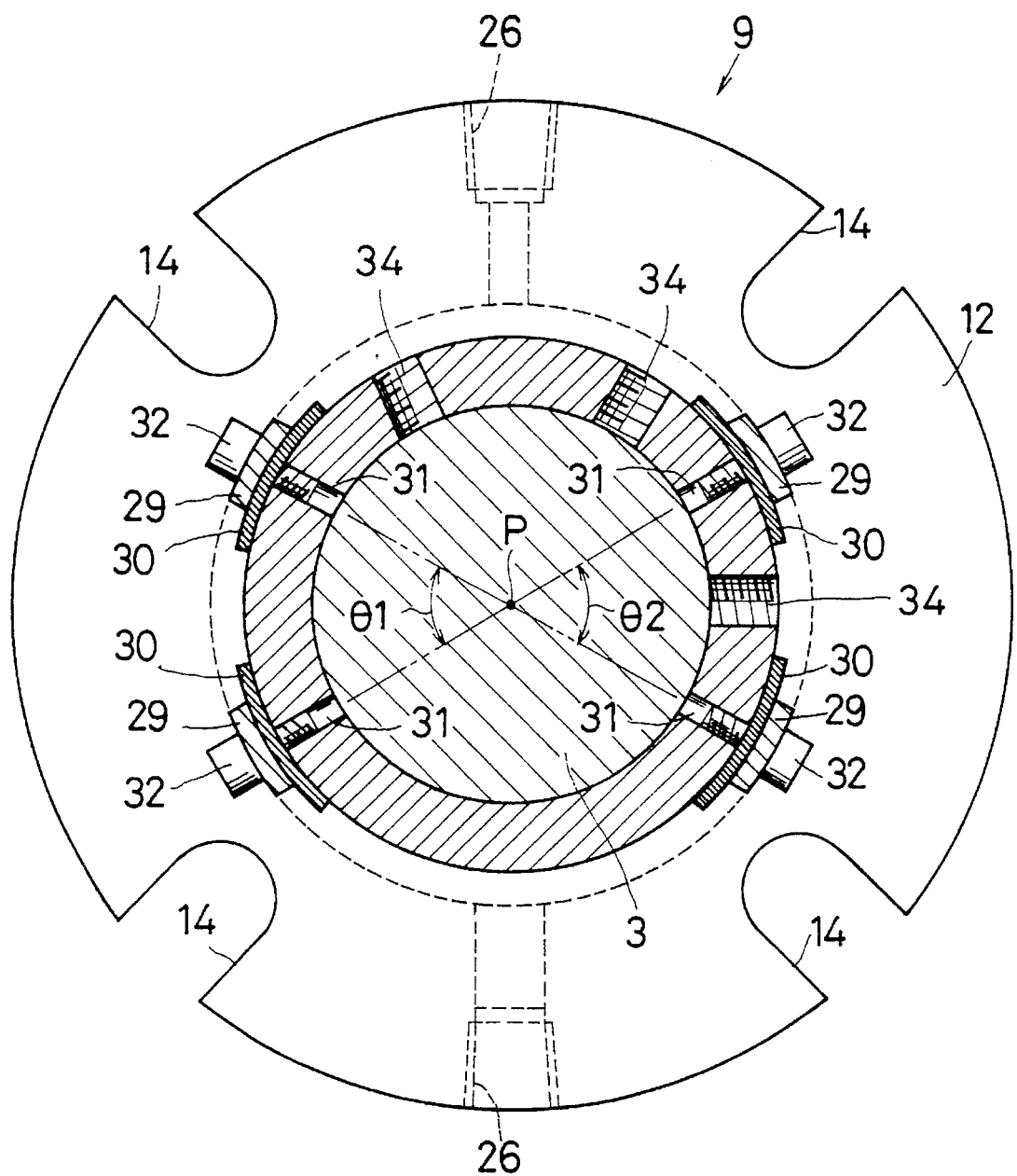
FIG. 3 is a sectional view of line A—A in FIG. 2.

FIG. 2 and FIG. 3 show practical constitutions of the outside type mechanical seal device 9, in which an annular first flange 11 composed of stainless steel or other metal, and an annular second flange 12 composed similarly of stainless steel or other metal are integrated with a total of four stainless steel joint bolts 13 . . . , and on the outer circumference of the flanges 11, 12, a total of four grooves 14 . . . are formed in notch as shown in FIG. 3, and a sheet packing 15 is disposed at the side of the stuffing box 10 10 of the first flange 11.

Inside of the first flange 11, an annular seat ring 16 made of metal, for example, tungsten is disposed, and an O-ring 17 for sealing between the elements 11, 16 is disposed in an O-ring groove formed outside of the seat ring 16. At four positions on the outer circumference of the seat ring 16, grooves 18 are notched and formed, and a stainless steel knock pin 19 at the first flange side is inserted into the grooves 18.

On the other hand, at the inner side of the second flange 12, an annular stainless steel stopper ring 21 fixed to the rotary shaft 3 is disposed by stainless steel setbolts 20 (see FIG. 5) upon completion of assembling. In the O-ring groove formed inside the stopper ring 21, an O-ring for sealing the elements 3, 21 is disposed, and at the end of the seat ring 16 side of the stopper ring 21, for example, four stainless steel knock-pins 23 are projecting integrally, and annular rotary rings 24 made of metal material such as SIC are disposed between the stopper ring 21 and seat ring 16 so as to be fitted with these knock pins 23, and a sliding surface (a shaft seat end surface vertical to the rotary shaft 3) S is set between the rotary surface at one end of the rotary ring 24 (the left end in FIG. 2) and the fixed surface at the other end of the seat ring 16 (the right end in FIG. 2).

At the first flange 11 side, moreover, to press the fixed surface of the seat ring 16 to the rotary surface of the rotary ring 24, a total of eight stainless steel springs 25 . . . are provided. In the drawing, numeral 26 is a quenching inlet for feeding cooling fluid or cleaning fluid, 27 is an O-ring, and 28 is a resin ring made of tetrafluoroethylene resin or the like.

In the second flange 12, plural protrusions 29 . . . are formed integrally so as to oppose the outer circumference of the stopper ring 21 at specific intervals. Besides, between the inside of the protrusions 29 and the outer circumference of the stopper ring, spacers 30 . . . at specific thickness made of synthetic resin such as polypropylene are interposed, and further in screw holes 31 . . . formed in the stopper ring 21, stainless steel cap bolts 32 penetrating through the protrusions 29 and spacers 30 from outside the protrusions 29 are detachably screwed.

In the protrusions 29, spacers 30 and cap bolts 32, as shown in FIG. 3, the group mutual disposing angle q1 of elements 29, 30, 32 positioned at the left side, and the group mutual disposing angle q2 of the elements 29, 30, 32 positioned at the right side are set at a mutually equal angle (q1=q2) relative to the center P of the axial center line of the rotary shaft 3. In this embodiment, forming the angles at q1=q2, four sets of elements 29, 30, 32 are disposed in total, but it may be also constituted to dispose the elements 29, 30, 32 at equal interval positions of three equal divisions, four equal divisions or more on the circumference, that is, at equal angle positions. Numeral 33 in the drawing is an O-ring for sealing between the elements 21, 12, and 34 is a screw hole formed in the stopper ring 21 for the purpose of screwing the setbolt 20.

Thus, by the thickness of the plural spacers 30 . . . interposed between the inside of the protrusions 29 and the outer circumference of the stopper ring 21, the stopper ring 21 disposed on the rotary shaft 3 is positioned in the radial direction (arrow a direction in FIG. 2) with respect to the axial center of the rotary shaft 3, and the cap bolt 32 penetrates through the spacer 30 to be screwed into the stopper ring 21, and if the spring force of the spring 25 acts in the direction of arrow f in FIG. 2, the stopper ring 21 is positioned in the thrust direction (arrow b direction in FIG. 2) relative to the rotary shaft 3. Such positionings in the radial direction and thrust direction are effected securely in the state before assembling shown in FIG. 5.

Figure 4:
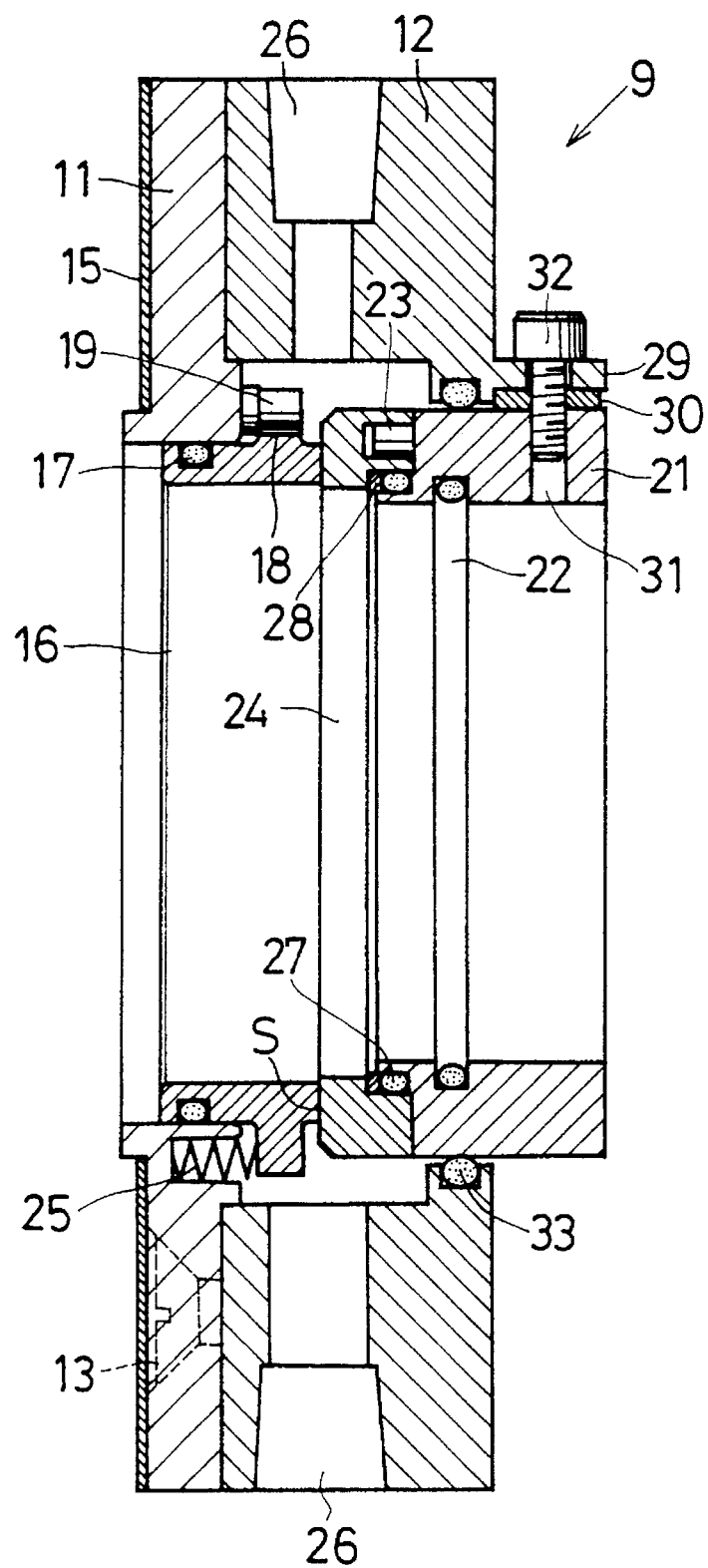
FIG. 4 is a sectional view before assembling of an integrated unit of outside type mechanical seal device.

Since the stopper ring 21 can be securely positioned thus in the radial direction and thrust direction, as shown in FIG. 4, the entire mechanical seal device 9 made of multiple parts (elements 11 to 34) can be integrated into a unit.

Therefore, when assembling the mechanical seal device 9, the integrated unit (see FIG. 4) is assembled between the rotary shaft 3 and the stuffing box 10 of the pump as the fixed side as described below, and the assembling job may be facilitated, so that any particular skill is not needed in assembling.

That is, to assemble the mechanical seal device 9, to assemble the mechanical seal device 9, in the first place, the integrated unit of mechanical seal device 9 (see FIG. 4) is inserted into the rotary shaft 3, and the stuffing box 10 of the pump casing 4 is incorporated. In this state, using the flange bolt not shown from the atmospheric side AI, and using the grooves 14 . . . , the flange bolt is tightened into the screw hole (not shown) of the stuffing box 10 side, and the integrated unit of the mechanical seal device 9 is bolted to the stuffing box 10.

Consequently, plural setbolts 20 (specifically hexagon socket head bolts) are driven into the screw holes 34, and the stopper ring 21 is fixed on the rotary shaft 3.

Figure 5:
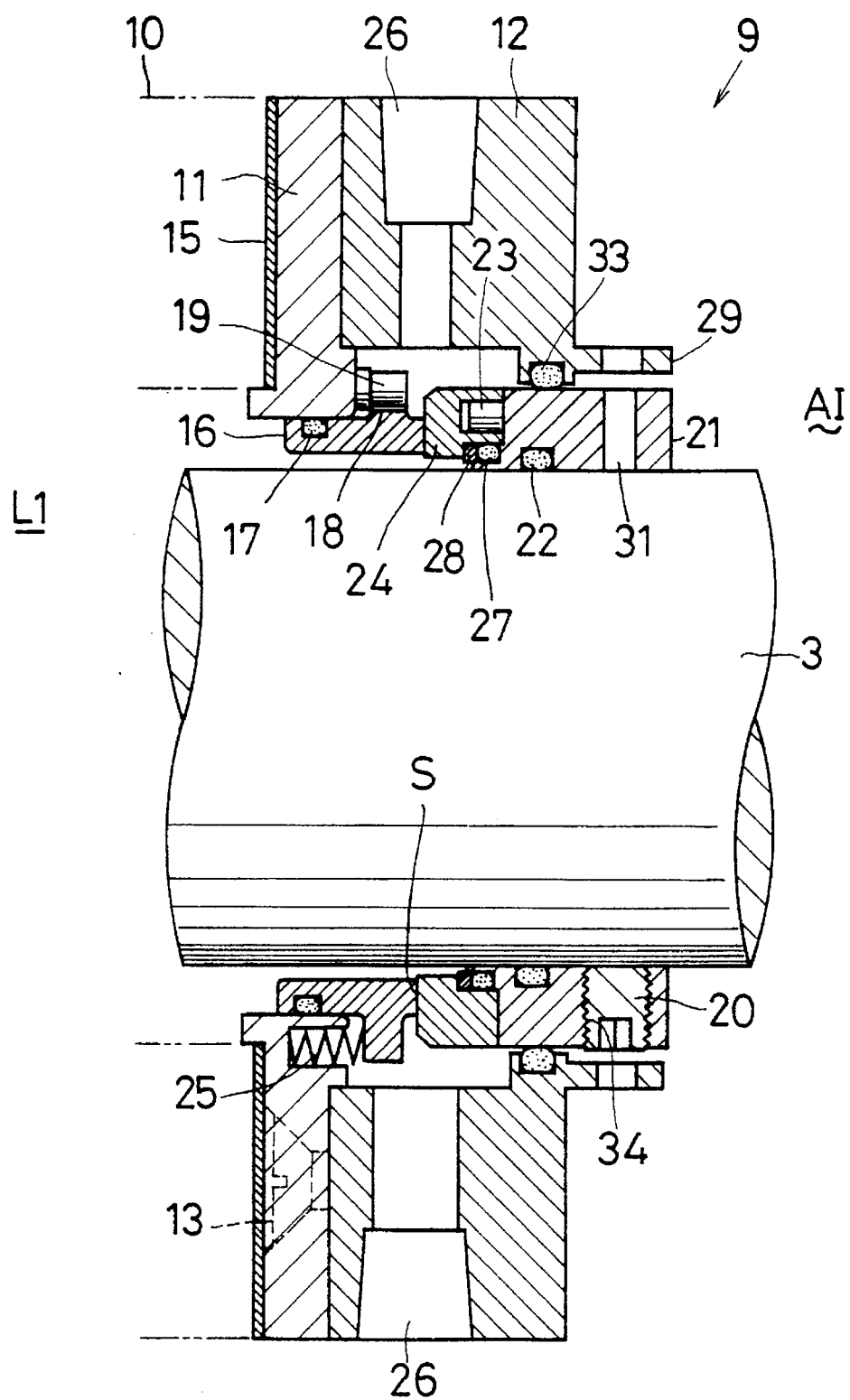
FIG. 5 is a sectional view upon completion of assembling of outside type mechanical seal device.

After pulling out the cap bolts 32, the spacers 30 are removed, then the assembling is over, becoming as shown in FIG. 5 at the end of assembling.

The shaft sealing action at the end of assembling is as follows. That is, the rotary ring 24 and stopper ring 21 follow the rotary shaft 3, being accompanied by the elements 20, 22, 23, 27, 28, while the flanges 11, 12, seat ring 16 and others are in fixed structure, and hence leak of the liquid LI to the atmospheric side AI is prevented on the sliding surfaces (sealing end surfaces) of the seat ring 16 pressed to the fixed ring 24 by the spring 25 and the rotary ring 24, thereby sealing the shaft.

In short, according to claim 1 of the invention, by the thickness of the plural spacers interposed between the inside of the protrusions and the outer circumference of the stopper ring, the stopper ring disposed on the rotary shaft is positioned in the radial direction to the axial center of the rotary shaft, and the cap bolt penetrates through the spacer to be screwed in the stopper ring, the stopper ring is positioned in the thrust direction (axial direction) to the rotary shaft.

In this way, since the stopper can be positioned securely in both radial direction and thrust direction, the entire mechanical seal composed of multiple parts can be integrated into a unit. Therefore, when assembling the mechanical seal, only the integrated unit may be incorporated between the rotary shaft and the fixed side, and the assembling job may be facilitated, thereby not requiring any particular skill.

According to claim 2 of the invention, in addition to the effects of the first claim of the invention, since the protrusions, spacers and cap bolts are disposed at equal angle positions about the center of the axial line of the rotary shaft, in particular, the positioning in the radial direction by the thickness of the spacer can be done uniformly from the equal angle positions on the outer circumference of the stopper ring, thereby achieving more secure positioning from the radial direction, in particular.

In contrast between the constitution of the invention and the foregoing embodiment, the flange of the invention corresponds to the second flange 12 of the claim, but the invention is not limited to the constitution of the embodiment alone.

For example, in the embodiment, it is constituted to seal between the liquid side LI and the atmospheric side AI, but it may be also constituted to seal between gas or other fluid side and the atmospheric side AI, and the material of each element disclosed in the embodiment is only an example, and it is not limitative, or the first flange 11 and the second flange 12 shown in the embodiment may be also composed in a single structure.

I claim:

1. An outside type mechanical seal device for preventing fluid or gas from entering into an atmospheric environment through leakage on the surface of a rotary shaft (3) connected between said atmospheric environment and a fluid or gas environment; said device comprising:

an annular first flange (11) surrounding said shaft (3):

means (15) for connecting said first flange (11) to a structure (10) holding said shaft (3):

an annular seat ring (16) fixed to said first flange (11) with a first seal means (17) disposed therebetween:

an annular second flange (17) connected to said first flange (11);

an annular stopper ring (21) fixed on said shaft (3) by a set bolt (20);

second seal means (22) disposed between said stopper ring (21) and said shaft (3);

an annular rotary ring (24) connected to said stopper ring (21) and disposed between said stopper ring (21) and said seat ring (16):

spring means (25) for pressing said seat ring (16) against said rotary ring third seal means (33) disposed between said second flange (12) and said stopper ring (21);

said second flange (12) comprising a plurality of protrusions (29) extending axially of said shaft (3) and located at positions confronting an outer circumference of said stopper ring (21) and at specified intervals around said outer circumference of said stopper ring;

a plurality of spacers (30) interposed between an inside surface of said protrusions (29) and said outer circumference of said stopper ring (21):

a plurality of cap bolts (32) connecting and aligning said protrusions, said spacers and said stopper ring, and being removed together with said spacers (30) after installation of the device on said shaft (3) and said structure (10), so that said stopper ring (21) and said rotary ring (24) rotate with the shaft (3), and the first flange (11), second flange (12) and seat ring (16) remain stationary with said structure (10) with said first, second and third seal means providing sealing function against leakage of fluid or gas.

2. The device of claim 1, wherein said protrusions, said spacers and said cap bolts are disposed at equal angular positions about the axial center line of said shaft.

* * * * *